United States Patent [19]

Seibel et al.

[11] 3,902,688

[45] Sept. 2, 1975

[54] I-TAIL EMPENNAGE

[75] Inventors: Charles M. Seibel; Francis E. Tiller, Jr., both of Arlington, Tex.

[73] Assignee: Textron, Inc., Providence, R.I.

[22] Filed: Mar. 15, 1974

[21] Appl. No.: 451,436

[52] U.S. Cl. ............................... 244/17.11; 244/87
[51] Int. Cl. ............................................. B64c 27/82
[58] Field of Search .... 244/87, 91, 90 A, 89, 17.13, 244/17.11, 17.19, 7 A, 90 R, 7 R, 6

[56] References Cited
UNITED STATES PATENTS

| | | | |
|---|---|---|---|
| 2,712,420 | 7/1955 | Amster et al. | 244/87 X |
| 2,805,032 | 9/1957 | Davis | 244/87 X |
| 2,941,792 | 6/1960 | Stutz | 244/17.13 X |
| 3,025,022 | 3/1962 | Girard | 244/7 A |
| 3,464,651 | 9/1969 | Lightfoot | 244/17.13 |
| 3,717,317 | 2/1973 | Certain | 244/87 X |

*Primary Examiner*—Trygve M. Blix
*Assistant Examiner*—Paul E. Sauberer
*Attorney, Agent, or Firm*—Richards, Harris & Medlock

[57] ABSTRACT

A tail structure for improved pitch stability of a helicopter in forward flight in which two horizontal stabilizers are mounted at the upper and lower tips of a vertical fin which extends above and below the tail boom to position the stabilizers outside of the fuselage wake in forward flight.

13 Claims, 6 Drawing Figures

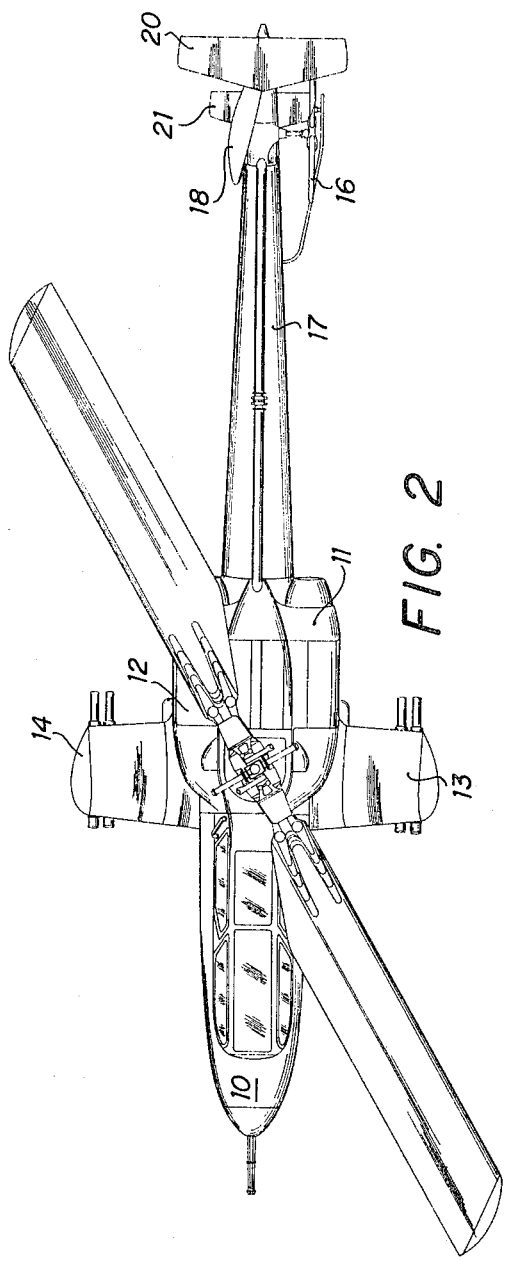
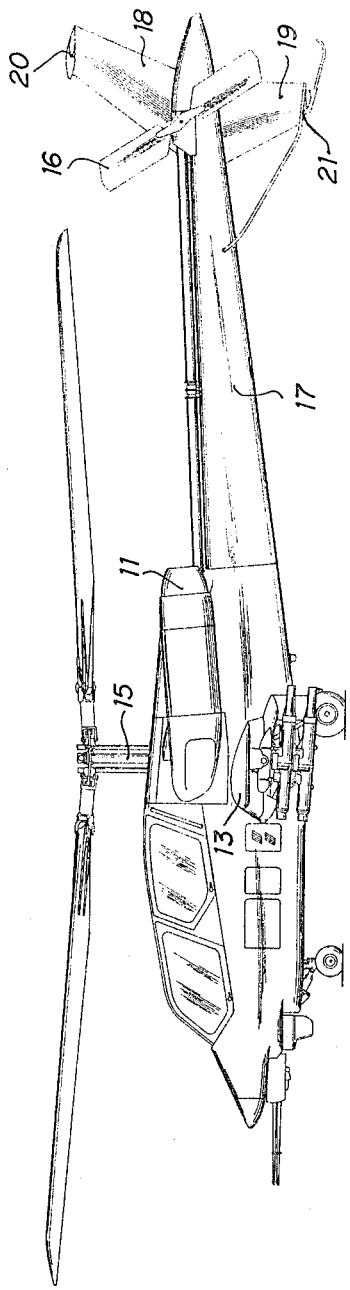
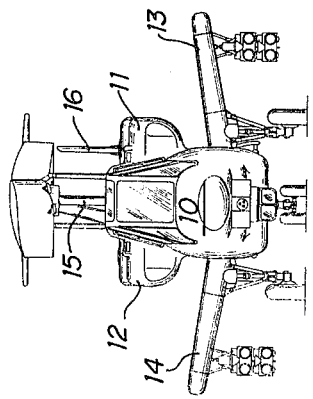
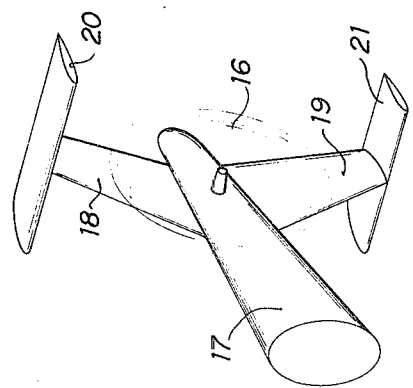

I-TAIL EMPENNAGE

FIELD OF THE INVENTION

This invention relates generally to a helicopter tail structure, and more particularly to a tail structure of improved pitched stability in forward flight wherein a pair of horizontal stabilizers are mounted on a vertical stabilizer as to be outside the fuselage wake in forward flight.

DESCRIPTION OF THE PRIOR ART

Military employment of helicopters in a wartime environment has necessitated some compromise of flying qualities. Considerations of survivability, ground clearance, and weapons requirements have influenced such modifications as the separation of engines and the inclusion of wings and wing stores.

Engine nacelles protrude laterally from the fuselage sides. They together with the presence of wings below produce a biplane effect and cause a high downwash gradient. As a result, the flow remains parallel to the tail boom as the fuselage angle of attack is varied. The contribution of a boom-mounted horizontal stabilizer to pitch stability is decreased. Observation of increases in stabilizer contribution to pitch moment where wings are removed has confirmed this effect. Helicopters having flush-mounted engines and smaller wings have not exhibited such characteristics.

Larger horizontal stabilizer surfaces produce a greater change in pitch moment with stabilizer incidence. However, a boom-mounted stabilizer large enough to provide inherent stability at high speed results in unacceptable compromises in weight, engine-wing placement, handling qualities at low speed, or overall performance.

Positioning the horizontal stabilizer forward or further aft on the tail boom also fails to significantly improve pitch stability. If the stabilizer is in the main rotor wake, the download penalty will be excessive in hover. If the stabilizer is far enough aft to be removed from the rotor wake in hover, the trim change associated with flight transition will be unacceptable.

SUMMARY OF THE INVENTION

The present invention is directed to improvements in pitch stability of a helicopter in forward flight without compromising flight performance or suffering the weight penalties associated with single, boom-mounted horizontal stabilizers.

More particularly, there is provided a boom-mounted vertical stabilizer which extends above and below the tail structure. Horizontal stabilizers are attached to the tips of the vertical stabilizer in an I-tail configuration. The vertical distance between the tips of the vertical stabilizer is made sufficient to keep one horizontal stabilizer out of the high downwash region behind the fuselage at all angles of attack. A large horizontal stabilizer is mounted high enough above the tail boom to be outside the high velocity main rotor wake. A smaller horizontal stabilizer with significantly less surface area is located far enough below the main rotor disc as to have negligible effects from main rotor wake impingement.

Since one horizontal stabilizer is always outside of the fuselage wake in forward flight, less total stabilizer area is required for pitch stability than if a single stabilizer is mounted within the fuselage wake. In addition to the obvious improvements in performance and weight that results from using less total stabilizer area, the I-tail configuration offers benefits of no download penalty in hover, minimal control trim position change with transition from hover to forward or rearward flight, minimal control trim position change with power, improved structural properties with the vertical stabilizer being endplated by the horizontal stabilizers, and increased tail rotor protection provided by the lower stabilizer.

In accordance with the present invention, a vertical stabilizer supported by the tail structure of a helicopter extends above and below the tail rotor. A large horizontal stabilizer is mounted on the vertical stabilizer at a level which is above the tail rotor, while a smaller horizontal stabilizer is mounted on the vertical stabilizer at a level which is below the tail structure. By separating the two surfaces vertically, one of them is outside the region of high downwash behind the fuselage at all angles of attack.

Preferably, the ratio of the areas of the upper and lower horizontal stabilizers is 70:30 for optimum pitch moment characteristics.

DESCRIPTION OF THE DRAWINGS

For a more complete understanding of the present invention and for further objects and advantages thereof, reference may now be had to the following description taken in conjunction with the accompanying drawings in which:

FIG. 1 is a pictorial view looking directly at the nose of a helicopter with laterally protruding engine nacelles and wings;

FIG. 2 is a top view of the helicopter of FIG. 1;

FIG. 3 is a side view of the helicopter of FIG. 1;

FIG. 4 is a perspective view of a helicopter tail boom with vertical and horizontal stabilizers;

DESCRIPTION OF A PREFERRED EMBODIMENT

Figure 5:
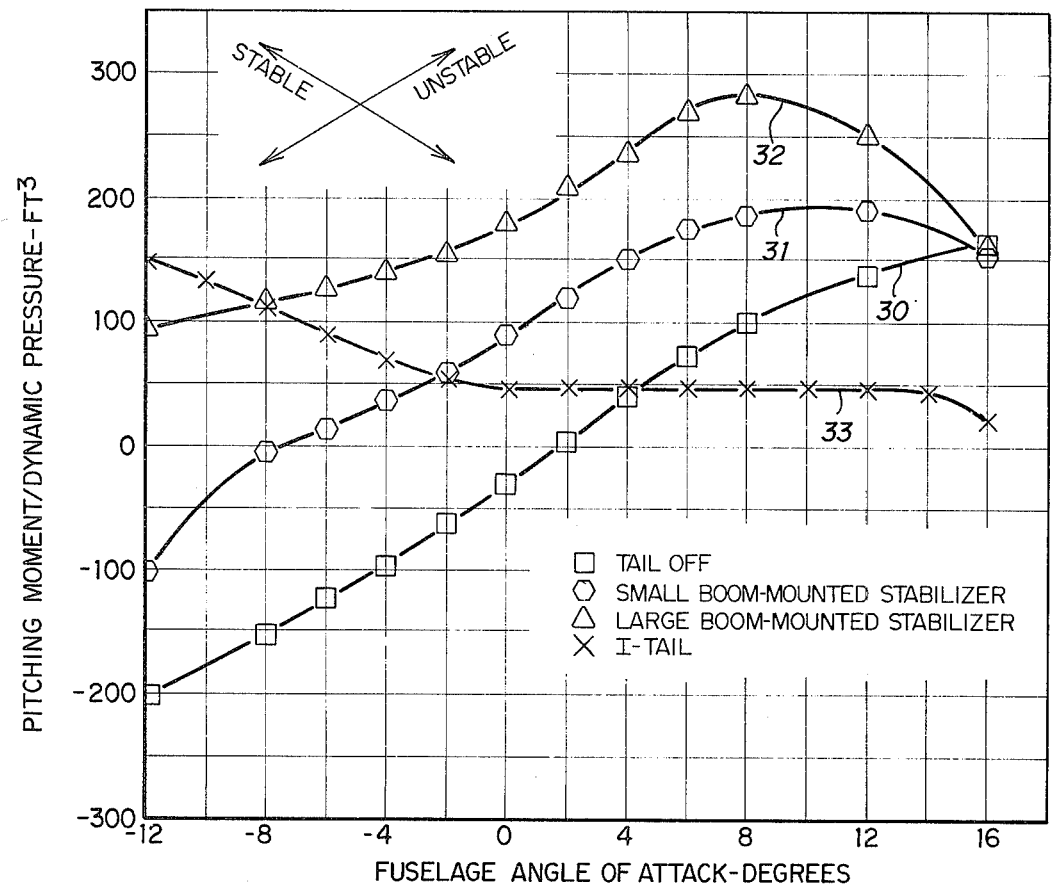
FIG. 5 illustrates (Pitching Moment/Dynamic Pressure) - Ft.$^3$ as a function of fuselage angle of attack for several empennage configurations.

FIGS. 1–3 illustrate a helicopter in which the present invention is employed.

As shown in FIG. 1, a fuselage 10 is mounted on conventional running gear and has a pair of jet engines in nacelles 11 and 12 occupying opposite sides of the fuselage and including short wings 13 and 14. A mast 15 with its rotor assembly extends above fuselage 10. A tail rotor 16 is mounted in conventional manner at the end of a boom 17. In such a biplane like structure where the wings 13 and 14 are included, air flow behind the wing-fuselage-engine area has a high downward gradient. The resulting air flow remains parallel to the tail boom as the angle of attack is varied. Single stabilizer surfaces mounted in the fuselage wake are unable effectively to stabilize helicopters in pitch.

In accordance with the invention, the aircraft is provided with a vertical stabilizer having a section 18 extending above the boom 17, as seen in FIG. 3, and a lower section 19 extending below boom 17. Two horizontal stabilizers are positioned so that they are outside the fuselage wake in forward flight. Pitch stability is achieved with less total stabilizer area than where a single stabilizer is mounted in the fuselage wake. More particularly, two horizontal stabilizers 20 and 21 are mounted at the tips of the vertical stabilizer members 18 and 19, respectively. They form an I-tail configuration supported by the tail boom 17. Thus, both horizontal stabilizers are positioned as to be out of the fuselage wake in forward flight. Consequently, at least one of the stabilizing surfaces remains out of the fuselage wake in other flight conditions such as in a climb, descent, or in autorotation. This provides adequate stability.

In FIG. 4 the horizontal stabilizers 20 and 21 are graphically portrayed in a perspective view. The vertical stabilizer comprising members 18 and 19 extends above and below, respectively, the tail boom 17. The horizontal stabilizer 20 preferably has an area significantly greater than the area of the lower stabilizer 21. The lower stabilizer 21 can be constructed of sufficient strength to be human weight supporting. It has been found that a ratio of areas on the order of 70:30 is preferable. Flight tests have been performed on a helicopter with an I-tail empennage of the type shown in FIGS. 1-4. The particular aircraft involved in such tests was of the type manufactured and sold by Bell Helicopter Company of Hurst, Texas, and identified as Model 206L, fitted with an I-tail structure of the type shown herein.

The results of wind tunnel tests are illustrated in FIG. 5. Curve 30 has been plotted for angles of attack varying from -12° to +16° where the tail structure is omitted from the helicopter. Curve 31 was obtained employing a small boom-mounted stabilizer at an intermediate point along the length of the tail boom 17. Curve 32 was obtained utilizing a boom-mounted stabilizer of significantly larger area than for the stabilizer involved in obtaining the curve 31.

The curve 33 was obtained utilizing the I-tail empennage of the type disclosed in FIGS. 1-4. Thus, the comparison of performance of a structure conforming to the present invention with the performance of other configurations clearly indicates that the I-tail structure lends stability greater than the stability in aircraft configurations employed to secure data to curves 30-32.

Figure 6:
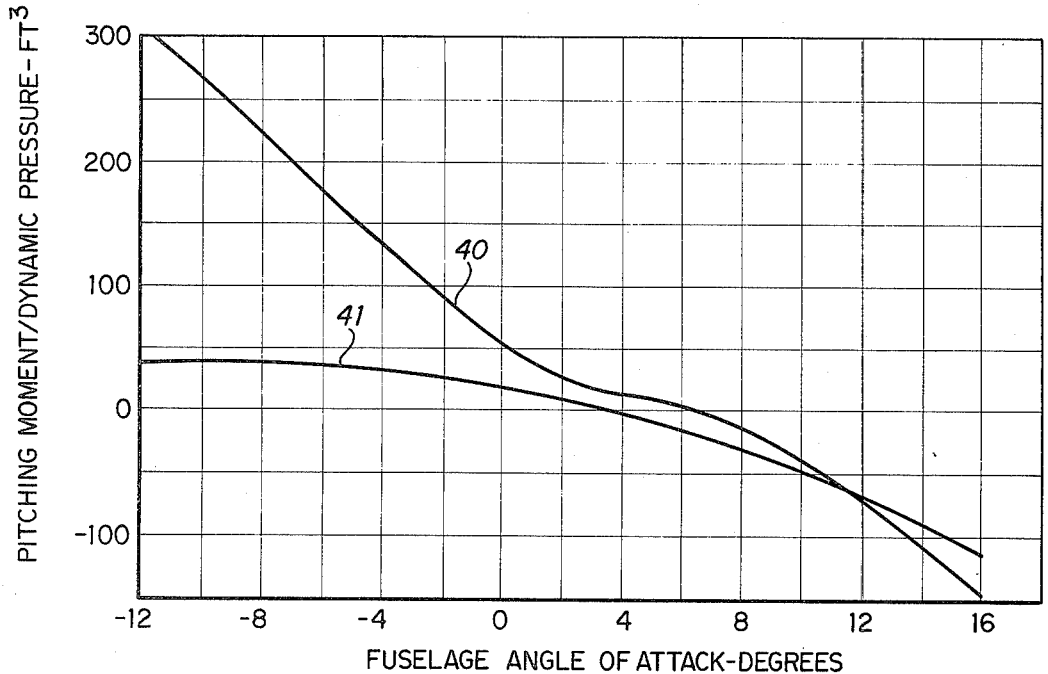
FIG. 6 illustrates I-tail (Pitching Moment/Dynamic Pressure) - Ft.$^3$ as a function of fuselage angle of attack.

FIG. 6 illustrates the relationship between pitching moment/dynamic pressure - ft.³ as a function of the fuselage angle of attack to show the pitching moment contribution of I-tail surfaces for primary mission configurations. Curve 40 illustrates the performance of the system utilizing only a large upper surface horizontal stabilizer of 15 sq. ft. Curve 41 illustrates the performance of the system using only a small lower surface stabilizer of 6 sq. ft. The optimum pitch moment characteristic occurs when about 70% of the total horizontal stabilizer area is mounted on top of the vertical fin forming the stabilizer 20 and when the remaining 30% represents the area of the lower horizontal stabilizer 21. The stabilizer 20 has its greatest influence at nose down angles of attack where it is mostly removed from the fuselage flow field. At increasingly nose up attitudes where it is subject to downwash from wing and engine nacelles, pitch moment contribution significantly decreases. The lower stabilizer 21 has a pitch moment contribution at nose down attitudes less than that of the upper stabilizer 20. Further, it has been found that total pitch stability is reduced at positive angles of attack typical of autorotation to minimize trim change with power.

Thus, in accordance with the present invention, there is provided an I-tail stabilizer empennage to improve the pitch stability of a helicopter in forward flight. More particularly, there is provided a boom-mounted vertical stabilizer which extends above and below the tail structure of a helicopter, and two horizontal stabilizers mounted at the tips of the vertical stabilizer. By separating the two horizontal surfaces vertically, less total stabilizer area is required and one of the stabilizers is removed from the region of high downwash behind the fuselage at all angles of attack.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a helicopter having a fuselage, main rotor and a tail structure mounted tail rotor, the combination which comprises:
   a. a vertical stabilizer supported by the tail structure of said helicopter and extending above and below said tail structure;
   b. a first horizontal stabilizer mounted above said tail structure and said tail rotor on said vertical stabilizer; and
   c. a second horizontal stabilizer mounted below said tail structure and said tail rotor on said vertical stabilizer.

2. The combination set forth in claim 1 wherein the ratio of the area of said first and second stabilizers is of the order of 70:30.

3. The combination set forth in claim 1 wherein said horizontal stabilizers are mounted outside of the fuselage wake in forward flight.

4. The combination set forth in claim 1 wherein said second stabilizer is mounted below said tail structure at a distance sufficient to minimize main rotor wake impingement on said second stabilizer.

5. The combination set forth in claim 1 wherein said first stabilizer is mounted above said tail structure at a distance to be removed from main rotor wake.

6. A stabilizer assembly for mounting on a helicopter having a fuselage, a main rotor and tail structure to improve pitch stability in forward flight, which comprises:
   a. a vertical stabilizer supported by said tail structure which extends above and below said tail structure; and
   b. two horizontal stabilizers separated vertically and appended to said vertical stabilizer.

7. The combination set forth in claim 6 wherein said horizontal stabilizers are attached to the tips of said vertical stabilizer.

8. The combination set forth in claim 6 wherein the higher of said horizontal stabilizers is larger.

9. The combination set forth in claim 8 wherein the ratio of surface areas of said higher and lower horizontal stabilizers is 70:30.

10. The combination set forth in claim 6 wherein said horizontal stabilizers are mounted outside of the fuselage wake in forward flight.

11. The combination set forth in claim 6 wherein the lower of said horizontal stabilizers is of human weight supporting construction.

12. A helicopter having fuselage, a main rotor, and a stabilizer tail assembly mounted on a tail structure supporting a tail rotor, the combination which comprises two horizontal stabilizers vertically separated to keep one of said stabilizers outside of fuselage wake at all angles of attack and both of said stabilizers outside of fuselage wake in forward flight, with the first of said stabilizers mounted above said tail rotor and said main rotor wake, and the second of said stabilizers mounted below said tail rotor and below the area of significant impingement by said main rotor.

13. The combination set forth in claim 12 wherein the ratio of the area of said first and second stabilizers is of order of 70:30.

* * * * *